US010838515B1

(12) United States Patent
Yitzhak et al.

(10) Patent No.: US 10,838,515 B1
(45) Date of Patent: Nov. 17, 2020

(54) TRACKING USING CONTROLLER CAMERAS

(71) Applicant: Facebook, Inc., Menlo Park, CA (US)

(72) Inventors: Eldad Yitzhak, San Mateo, CA (US); Oskar Linde, San Carlos, CA (US); Andrew Melim, Seattle, WA (US); Samuel Redmond D'Amico, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/367,032

(22) Filed: Mar. 27, 2019

(51) Int. Cl.
*G06F 3/03* (2006.01)
*G06T 7/73* (2017.01)
*G06F 3/01* (2006.01)
*G06F 3/0346* (2013.01)

(52) U.S. Cl.
CPC ............ *G06F 3/0325* (2013.01); *G06F 3/011* (2013.01); *G06F 3/0346* (2013.01); *G06T 7/74* (2017.01); *G06T 7/75* (2017.01); *G06T 2207/30196* (2013.01)

(58) Field of Classification Search
CPC ...... G06F 3/0325; G06F 3/0346; G06F 3/011; G06T 7/74; G06T 7/75; G06T 2207/30196
See application file for complete search history.

(56) References Cited

U.S. PATENT DOCUMENTS

| 10,322,506 B2 * | 6/2019 | Ding | B25J 9/1602 |
| 10,565,731 B1 * | 2/2020 | Reddy | G06F 3/012 |
| 10,636,170 B1 * | 4/2020 | Reddy | G06T 7/75 |
| 2019/0378403 A1 * | 12/2019 | Song | H04W 4/80 |

* cited by examiner

*Primary Examiner* — Rodney Amadiz
(74) *Attorney, Agent, or Firm* — Fenwick & West LLP

(57) ABSTRACT

A virtual reality (VR) system tracks the location and position of a controller using image sensors on a headset and a controller. The headset and controller provide a first and second view of a user's environment. Using its camera, the headset generates a map of the environment and identifies its location within it. Based headset's location, the VR system generates a simulated world of the environment and displays it to the user. The headset also estimates the location of the controller. Based on the estimated location, the headset sends a portion of the map to the controller. The controller determines its pose using the portion of the map, the image sensors, and additional sensors. The controller sends its pose and an updated portion of the map to the headset. Based on the controller's pose and updated portion of the map, the VR system modifies the content displayed to the user.

20 Claims, 6 Drawing Sheets

200

TRACKING USING CONTROLLER CAMERAS

BACKGROUND

This disclosure relates generally to virtual reality systems and more specifically relates to tracking the location and position of controllers of virtual reality systems.

Virtual reality (VR) systems generate simulated worlds for users. Users explore simulated worlds through the various components of the VR system, such as a headset and a controller. Typically, content is displayed to a user on a headset that may include a view of the virtual world. In other circumstances, such systems may 'augment' a view of the real world by providing an overlay of the user's view of the environment. VR systems often allow users to interact with the system via movement in the environment and the VR system may determine which content to display based on the location and orientation of the user with respect to the environment and the movement of the user's body within the environment.

In some VR systems, the location and orientation of a user is tracked by an external tracking device that tracks a headset worn by the user and a controller held by the user, the external tracking device being external to both the headset and the controller. However, these systems can limit user mobility because users and the controllers must remain within the field of view of the external tracking device to accurately track the location of the headset and controllers. In other VR systems, the location and orientation of the user and controllers is determined by the headset. In these systems, the headset may have an image sensor (e.g., a camera) that tracks the controller. To aid in tracking, the controller may emit signals for detection by the headset or external camera, which has detector lights, e.g., infrared (IR) light emitting diodes (LEDs). However, these systems also limit the mobility of the user because the controller must remain in the field of view of the headset. Further, these systems typically require all the computational work to be performed by the headset.

SUMMARY

A virtual reality (VR) system tracks the location and position of a controller using image sensors (cameras) on a headset and a controller that are in communication with each other. The VR system includes a headset worn by a user and a controller held by the user, each including one or more cameras. Multiple cameras on the headset and/or controller widen the field of view of the VR system, make it robust against occlusion, and enable body tracking. Additional controllers, an external base station, an external tracking system, and other components may be included in the VR system.

The headset provides a view of the user's environment from the user's point of view, and the controller provides a view of the user's environment from the controller's point of view. The headset and controller share their respective views as portions of a map of the user's environment, from which the position and orientation ("pose") of the controller can be determined. The VR system generates a simulated world for the user, displayed on the headset, based on the views provided by the headset and controller. By using the views of the user's environment, the VR system may determine the location of the user, incorporate body tracking into the content displayed to the user, and resolve features of the user's environment with greater confidence than when a single camera on the headset is used. The VR system is also able to locate and track the controller with greater confidence than when a single camera headset is used.

A headset identifies the environment in which the headset and a controller are located and generates a map of the environment. In some embodiments, the map is a three-dimensional point cloud and may include all or some of the objects in the environment. Using its camera, the headset identifies its location within the environment. Based on the location of the headset, the VR system generates a simulated world of the environment and displays it to the user on the headset.

The headset also determines an estimated location of the controller. Based on the estimated location of the controller, the headset selects a portion of the map of the environment to send to the controller. In some embodiments, the headset selects a portion of the map based on one or more rules. Examples of rules include a region that is within a threshold distance of the estimated location of the controller, a predetermined portion of the map, etc.

The controller determines its pose using the portion of the map sent from the headset, one or more cameras, and sensors. Examples of sensors include magnetometers, accelerometers, gyroscopes, etc. In some embodiments, the controller may also update the portion of the map. For example, the controller may resolve features of the objects in the map of the environment, identify objects in the environment not seen by the headset, and re-compute scaling metrics. The controller sends its pose and an updated portion of the map to the headset. Based at least in part on the pose of the controller and updated portion of the map, the VR system modifies the content displayed to the user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Figure 1A:
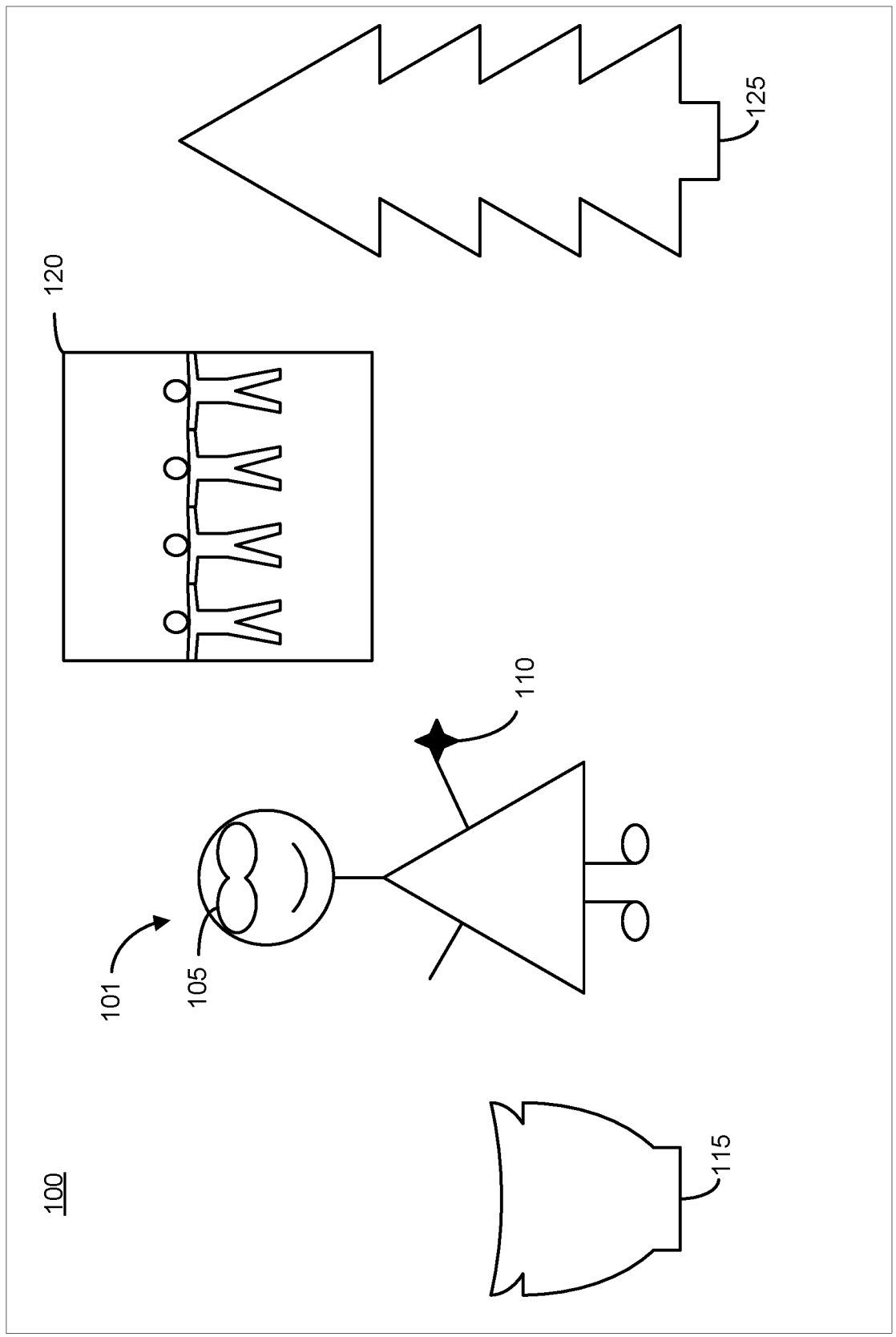
FIG. 1A is an example of an environment including a virtual reality system and a user using the virtual reality system, in accordance with an embodiment.

FIG. 1A is an example of an environment 100 that includes a virtual reality (VR) system for tracking the position and orientation ("pose") of a controller 110 and the movement of a user 101, according to an embodiment. The environment 100 includes a user 101 using a headset 105 of the VR system and a controller 110 of the VR system, and various other objects within the environment 100 including, e.g., a vase 115, a picture 120, and a tree 125. The components of the VR system, the headset 105 and the controller 110, collectively generate a map of a user's environment that may be used by the VR system to generate and display a simulated world to a user 101 of the VR system. The headset 105 provides a view from the point of view of the user 101, and the controller 110 provides a view from the point of view of the controller 110. The headset 105 is often less mobile and larger than the controller 110, and provides an elevated view of the environment 100. By using the different views (i.e., the view from the headset 105 and the view from the controller 110), the VR system may determine the location of the user 101, incorporate body tracking into the content displayed to the user 101, and update the map of the user's environment with greater confidence than when a single camera on the headset is used. The VR system is also able to locate and track the controller 110 with greater confidence than when a single camera headset is used.

The user 101 wears the headset 105 and holds the controller 110. The user 101 may use the controller 110 by moving the controller 110 through space, rotating the user's body, and rotating the controller 110. The movement of the user 101 and the controller 110 are captured by image sensors (e.g., cameras) on the head 105 and on the controller 110. In some embodiments, the user's movement and the movement of the controller 110 may also be captured by an external tracking device with one or more additional cameras, an external base station, or additional controllers. The VR system may track the user's movement within the environment 100 (e.g., through body tracking) using images captured from the headset 105 and controller 110, and adjust the content displayed to the user 101 accordingly. For example, the position of the user 101 may be determined by applying a computational model to images captured on the headset 105 and/or controller 110, the output of the computational model is used to adjust the content displayed to the user 101. Examples of computation models include convolutional neural networks, recurrent neural networks, long short-term memory networks, and the like. Body tracking may also be used to provide warnings to the user 101 when the user 101 is near other objects in the environment 100, or to provide body presence to the user 101. Body presence is a psychological and physiological sensation of a user actually being immersed in a virtual environment Body presence improves spatial stability, provides the illusion of physical interaction with objects in an environment, and provides a sense of embodiment.

The camera(s) on the headset 105 capture a first view of the environment 100 because of the position of the headset 105 relative to the user 101. The headset 105 generates a map of the environment 100 using objects of the environment 100 and estimates the location of the controller 110 and user 101. The headset 105 sends portions of the map to the controller 110 based on the estimated location of the controller 110. Sending portions of the map to the controller 110 allows for map synchronization between the headset 105 and controller 110. For example, the controller 110 may not build its own map of the environment; rather it can build a local map from the portion of the map that the headset 105 provided. The camera(s) on the controller 110 captures a second view of the environment 100, the second view differing from the first view because of the controller's position relative to the user 101. Using its respective view, the controller 110 can update portions of the map received from the headset 105. For example, the controller 110 may resolve features (e.g., contours, curves, edges) of objects in the environment, identify objects not previously seen by the headset 105, and update scaling metrics miscalculated by the headset 105.

In some embodiments, maps of the environment 100 are shared between the headset 105 and controller 110 over Bluetooth or Wi-Fi. In other embodiments, the headset 105 and controller 110 are physically connected. Maps are shared directly between the headset 105 and controller 110 or through an external base system (not shown).

Figure 1B:
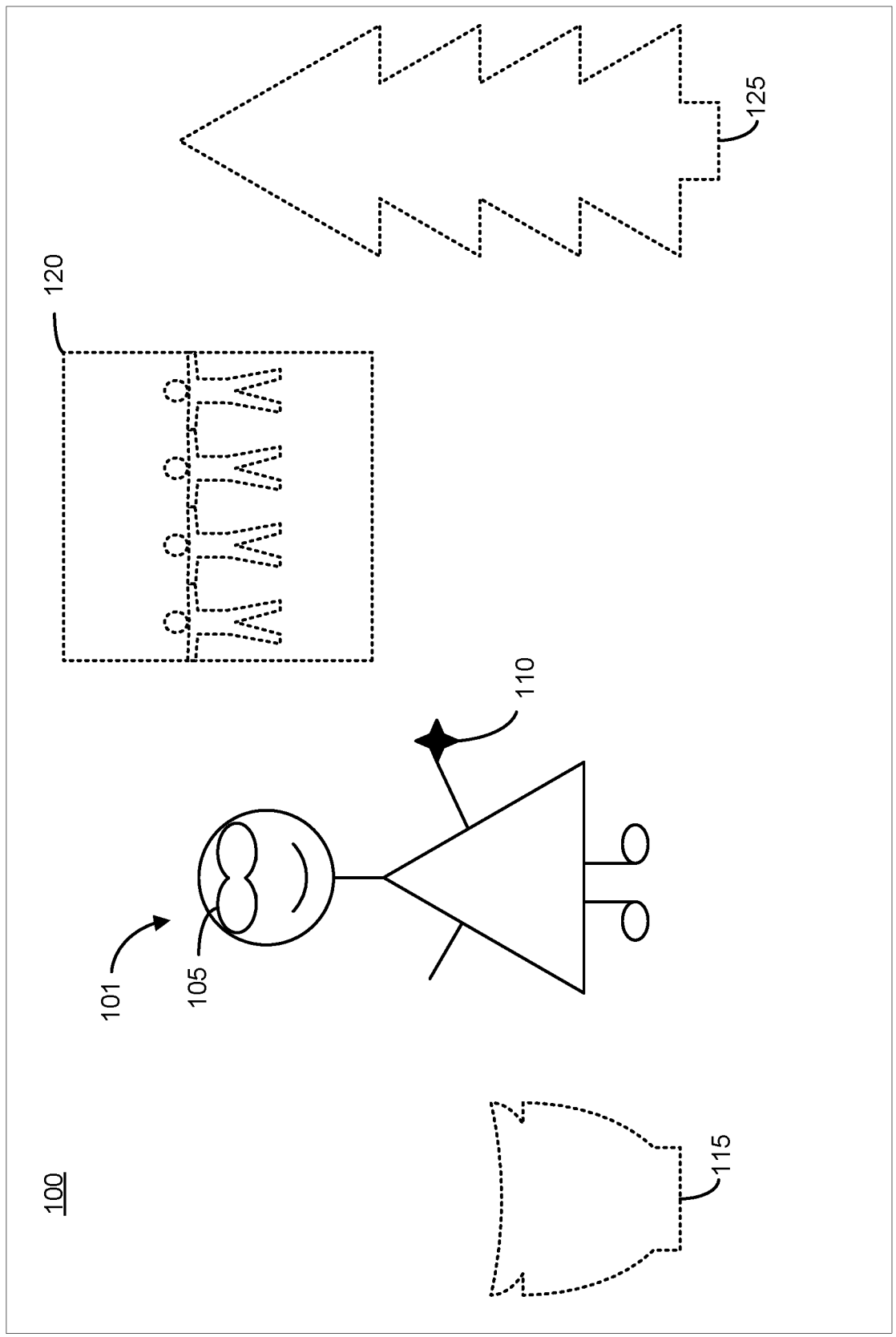
FIG. 1B is an example of a three-dimensional point cloud of an environment, in accordance with an embodiment.

FIG. 1B is an example of a map of an environment 100 generated by the headset 105, in accordance with an embodiment. Using the camera(s) and a computer of the headset 105, the headset 105 generates a map of the environment 100. In some embodiments, the map may be a three-dimensional point cloud with points of position and color, or key point descriptors, or a three-dimensional simulated model of the environment, etc. The map may be generated by combining points observed by the cameras or by simultaneous localization and mapping (SLAM). Everything within the view of the headset 105 (represented as dashed lines) may be added to the point cloud. Alternatively, the headset 105 may only include features of objects in the environment 100 that are selected based on particular characteristics, such as key point descriptors (e.g., scale invariant feature transform (SIFT) descriptors).

Figure 1C:
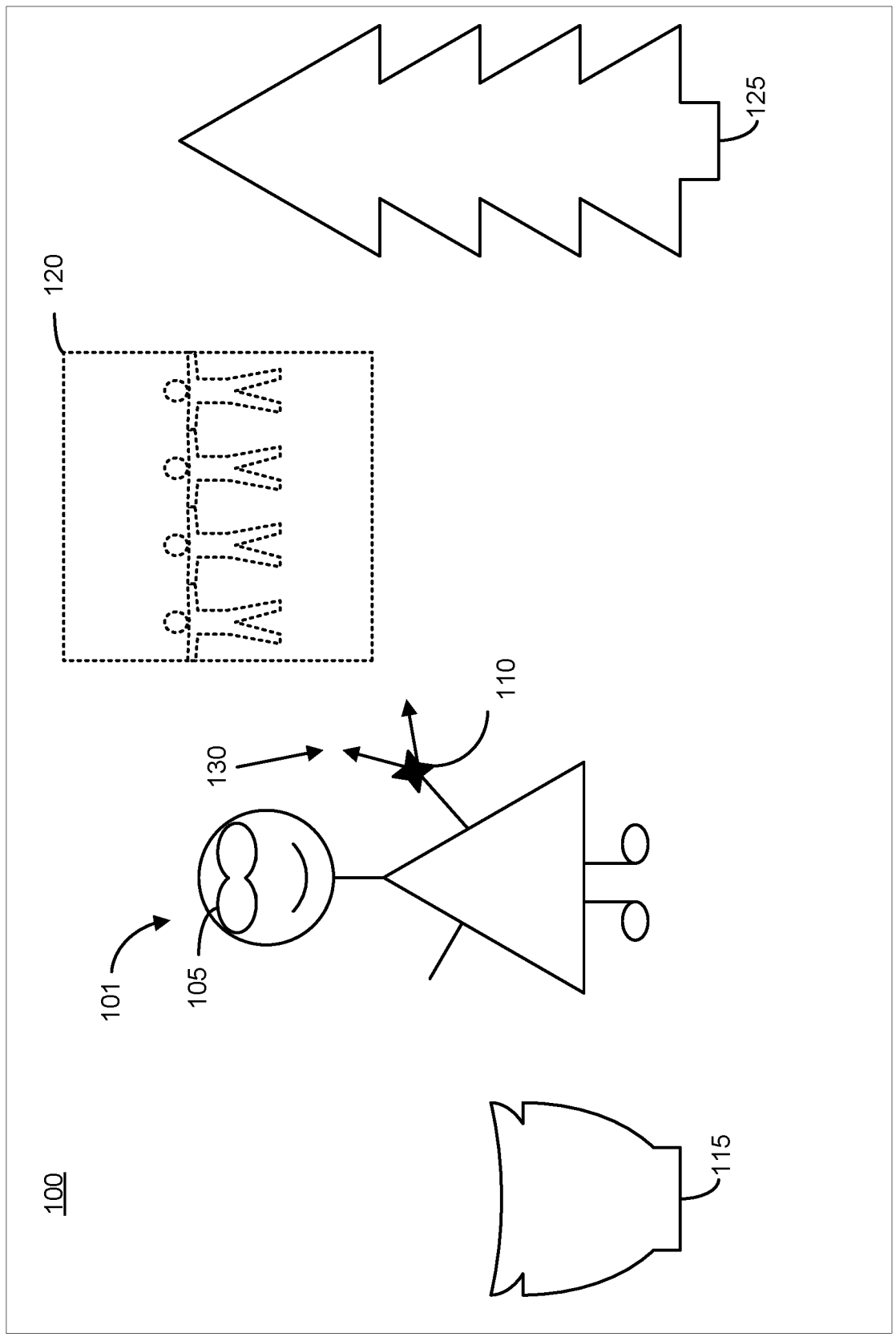
FIG. 1C is an example of a portion of a three-dimensional point cloud of an environment sent to a controller of the virtual reality system, in accordance with an embodiment.

FIG. 1C is an example of a portion of a map sent by a headset 105 to a controller 110 of the VR system, in accordance with an embodiment. The headset 105 estimates the location of the controller 110 within the environment 100. The headset 105 may estimate the location of the controller 110 using the camera(s) on the headset 105, additional sensors on the headset 105, information received from the controller 110, an external tracking system, an external base station, etc. The headset 105 also predicts which objects of the environment 100 are in the view of the controller 110. To do this, the controller 110 may send the headset 105 an indication of the controller's view 130. Alternatively, the headset 105 may receive view information of the controller 110 from an external tracking device and/or external base station. The points the headset 105 sends the controller 110 may match some or all of the points the headset 105 identified in the three-dimensional point cloud.

Using the estimated location and view 130 of the controller 110, the headset 105 selects a portion of the map to send to the controller 110. In some embodiments, the headset 105 selects a portion of the map based on one or more rules. Examples of rules include selecting a portion of the map that is within threshold distance between the estimated location of the controller 110, selecting a portion of the map that is within a threshold field of view of the controller 110, sending a pre-determined fraction of the map to the controller 110, etc. The selected portion of the map is sent to the controller 110. In some embodiments, the portion of the map is sent to the controller 110 wirelessly, e.g., over Wi-Fi or Bluetooth.

Figure 1D:
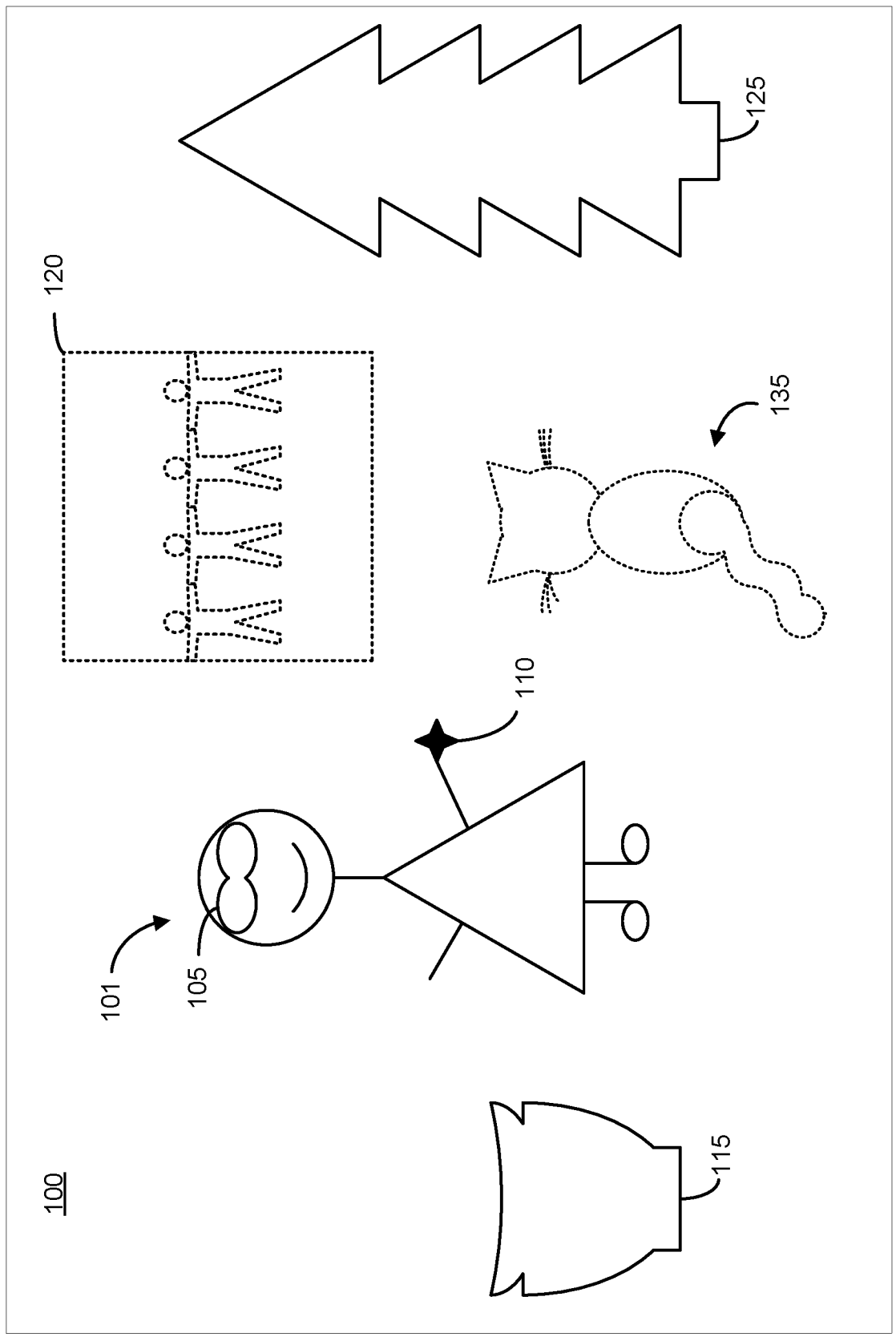
FIG. 1D. is an example a three-dimensional point cloud of an environment generated, in part, by a controller of the virtual reality system, in accordance with an embodiment.

FIG. 1D is an example of a map of an environment 100 generated, in part, by the controller 110 in accordance with an embodiment. The controller 110 uses the portion of map received from the headset 105, the camera(s) on the controller 110, and a computer on the controller to determine its pose within the environment 100. The controller 110 may also use one or more sensors to determine its pose. Examples of sensors may include an accelerometer, a gyroscope, and a magnetometer. In some embodiments, the controller 110 uses an inertial measurement unit (IMU) to determine its pose. The controller 110 can determine its pose as a set of numerical values for the six degrees of freedom, as ranges of values, or any combination thereof.

The controller 110 also updates the portion of the map, and corresponding metrics, sent from the headset 105. In some embodiments, to update the portion of the map, the controller 110 generates its own map of the environment 100 and compares it to the map received from the headset 105. The controller 110 may add features to the map that were not present when the headset 105 generated the map of the environment 100. For example, a housecat 135 may not have been in the environment 100 when the headset 105 generated the map or sent a portion of the map to the controller 110. However, the housecat 135 entered the environment 100 when the controller 110 was determining its pose. Similarly, the controller 110 may resolve features in the map that were not seen by the headset 105. The headset 105 may leave features unresolved because of the point of view of the headset 105 and/or configuration of the cameras within the headset 105. For example, the headset 105 may have viewed the painting 120 as a two-dimensional figure. However, the controller 110 could resolve the three-dimensionality of the painting 120 because of the orientation and configuration of the one or more cameras in the controller 110. The controller 110 may also re-compute scaling metrics for the portion of the map using a combination of its cameras, sensors, and computer. Scaling metrics are computed based on the movement and position of the controller 110 relative to the objects. Alternatively, the controller 110 may have multiple cameras a known distance apart, from which size and scale can be determined.

The controller 110 may send its pose to the headset 105. Alternatively, an external base station may detect the controller's pose from the controller 110 and provide pose information to the headset 105. In some embodiments, the controller 110 also sends the updated portion of the map and re-computed scaling metrics to the headset 105. The controller 110 may send the entire portion of the updated map or only send features that were updated and/or modified by the controller 110.

Figure 2:
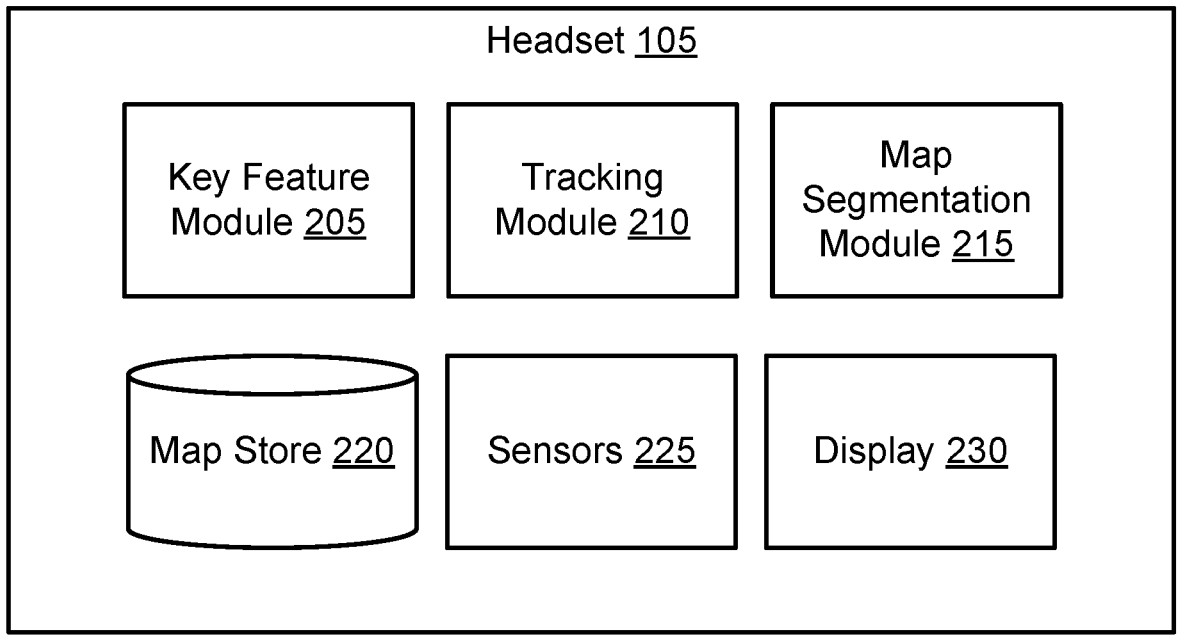
FIG. 2 is a block diagram of a virtual reality system environment, in accordance with an embodiment.
Figure 2:
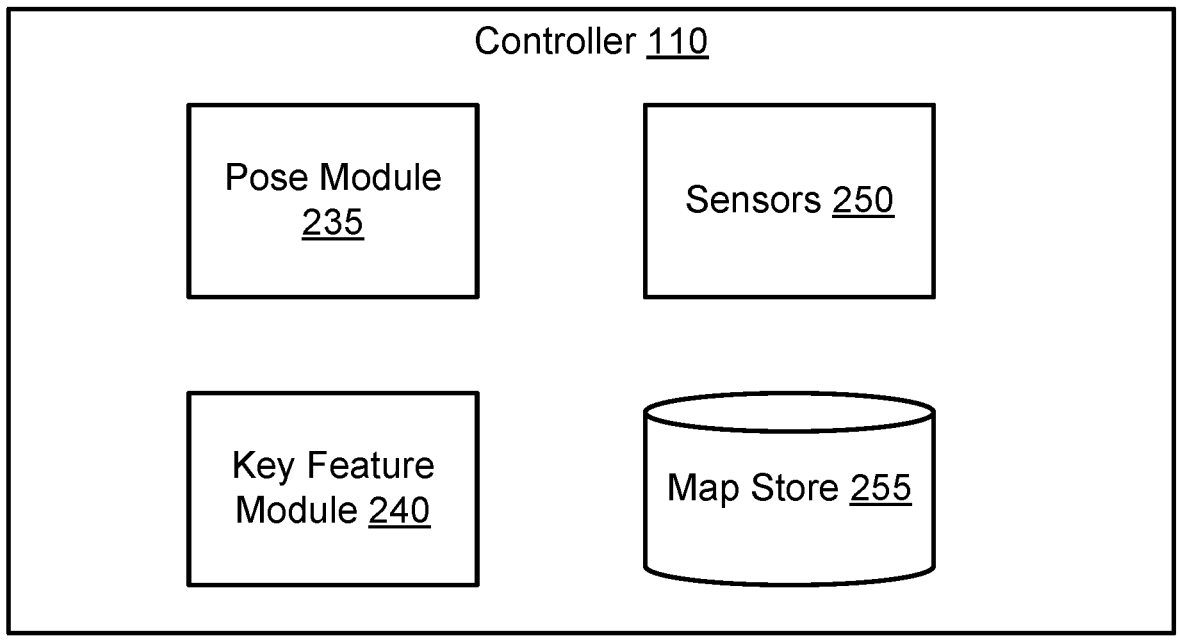

FIG. 2 is a block diagram of a VR system environment 200. The components of the VR system include a headset 105 and a controller 110. While FIG. 2 shows an example system environment 200 including one headset 105 and one controller 110, in other embodiments any number of these components may be included in the system environment 200. For example, there may be separate controllers that capture images from different positions of the controller 110, an external base station, external tracking device, etc. In alternative configurations, different and/or additional components may be included in the system environment 200.

The components of the VR system are in communication with each other. For example, the components may be wired together or in wireless communication over Bluetooth or Wi-Fi. In some embodiments, the headset 105 and controller 110 are both connected to an external base station. In other embodiments, the headset 105 and controller 110 are connected directly to each other.

The headset 105 is a head mounted display that provides content to a user 101. Examples of content include images, video, audio, or some combination thereof. In one embodiment, the headset 105 includes a key feature module 205, a tracking module 210, a map segmentation module 215, a map store 220, sensors 225, and a display 230. Sensors 225 include one or more imaging sensors, such as a camera or any other device, capable of capturing images of an environment 100 including a controller 110 and a user 101. The headset 105 calibrates the camera by adjusting one or more imaging parameters (e.g., focal length, frame rate, ISO, sensor temperature, shutter speed, aperture, etc.) for capturing images of the environment 100. Additional sensors 225 are used by the headset 105 to estimate its position and location within the environment 100. Examples of additional sensors include one or more accelerometers, one or more gyroscopes, one or more magnetometers, another suitable type of sensor that detects motion, or some combination thereof.

The key feature module 205 detects key features in the environment and generates a map of an environment, as shown in FIG. 1B, using the one or more cameras. The key feature module 205 may generate a map of an environment 100 as a three-dimensional point cloud or other computer model. The key feature module 205 may also compute scaling metrics of the map, metadata, etc. The key feature module 205 sends maps of the environment 100 to the map store 220, where maps and portions of maps are stored. In some embodiments, the key feature module 205 updates previously generated maps using one or more sensors 225, information received from the controller 110, or other system components.

The tracking module 210 determines the location of the headset 105 and controller 110 within an environment using one or more sensors. The tracking module 210 may compare the output of the one or more sensors to maps stored in the map store 220 to identify the location of the controller 110 and/or controller. The tracking module 210 may also determine the location of the headset 105 and controller using information received from an external tracking device. In some embodiments, the tracking module 210 also estimates the orientation and/or view of the controller 110. The tracking module 210 may track the user 101 within the environment, e.g., for body tracking. The tracking module 210 sends the location of headset 105 to the map segmentation module 215.

The map segmentation module 215 segments the map of the environment 100 generated by the key feature module 205. In some embodiments, the map segmentation module 215 determines which portion of the map should be sent to the display 230 and which portion of the map should be sent to the controller 110. To determine which portion of the map should be sent to the display 230, the map segmentation module 215 obtains location information of the headset 105 from the tracking module 210, location information of the controller 110, and information from tracking the user's movement within the environment 100.

To determine which portion of the map should be sent to the controller 110, the map segmentation module 215 uses the controller's 110 estimated location from the tracking module 210 and compares it to a set of rules. Examples of rules include selecting a portion of the map that is within threshold distance between the estimated location of the controller 110, selecting a portion of the map that is within a threshold field of view of the controller 110, sending a pre-determined fraction of the map to the controller 110, etc. The portion of the map may be a portion of the three-dimensional map or it can be a summarized version of the portion of the map. The summarized version may include a set of map features the headset 105 expects the controller 110 needs to determine its pose. In other embodiments, the entire map of the environment is sent to the controller 110.

The display 230 displays content to the user 101 in accordance with the portion of the map sent from the map segmentation module 215 and information from body tracking. Body tracking may be used to identify which components of the map should be displayed to the user 101. Body tracking may also be used to identify a portion of the user's body that should be displayed to the user 101 to provide body presence. Body presence improves spatial stability, provides the illusion of physical interaction with objects in an environment, and provides a sense of embodiment. In various embodiments, the display 230 may comprise a single display or multiple displays (e.g., a display for each eye of a user). Additional processing may be performed on the portion of map before it is displayed to the user 101. For example, the VR system may generate a simulated world from the portion of the map, render video, add sensory features (e.g., audio, haptic feedback, etc.).

The controller 110 contains a pose module 235, a key feature module 240, sensors 250, and a map store 255. In other embodiments, more, fewer, or different components can be used to represent the functionality of the controller 110.

The pose module 235 determines the pose of the controller 110 using sensors 250 and the portion of the map sent from the headset 105. In some embodiments, the module 235 may also use maps generated by the controller 110 that are stored in the map store 255. Sensors 250 may include one or more cameras, an IMU, accelerometers, gyroscopes, magnetometers, etc. In various embodiments, sensors may be internal or external to the IMU. One or more cameras are used to generate a map of the environment from the point of view of the controller 110 or update the portion of the map sent from the headset 105. The output of the sensors 250 is sent to the key feature module 240 to update the portion of the map sent from the headset 105. The pose of the controller 110 is sent to the headset 105. Content displayed to the user 101 may be modified based on the received pose information. For example, if the estimated location of the controller 110 is a threshold distance away from the actual location of the controller, the content displayed to a user may be modified. Additionally, if the difference in the estimated orientation of the controller 110 and the actual orientation of the controller 110 is greater than a threshold, the content displayed to a user may also be modified.

The key feature module 240 updates the portion of the map sent from the headset 105. To do this, the key feature module 240 accesses, from the map store 255, a map generated by the sensors 250 and compares it to the portion of the map sent from the headset 105. For example, the key feature module 240 may add objects to the portion of the map that were not previously seen by the headset 105. This may include adding objects that were not in the environment when the headset 105 generated the map of the environment. Similarly, objects may be added that were not in the environment when the headset 105 sent the portion of the map to the controller 110. The key feature module 240 may also resolve features (e.g., curves, contours, edges) in objects in the portion of the map that were distorted or miscalculated. Such distortions and miscalculations may occur because of headset's elevated point of view, limited range of motion, and large form factor. For example, a headset 105 may view a table as a two-dimensional object because only the top surface of the table is in the view of the headset 105. The controller 110 provides a view of the user's environment from the point of view of the controller 110, and the controller 110 is often more mobile than the headset 105. As a result, the controller 110 can resolve features of objects that were incorrectly seen by the controller 110. For example, the controller 110 can resolve the table as a three-dimensional object. The controller 110 would then update the portion of the map to include the correct dimensions of the table. The key feature module 240 can also update scaling metrics miscalculated by the headset 105 for the portion of the map. The updated portion of the map is stored in the map store 255. The key feature module 240 also sends the updated portion of the map to the headset 105. In some embodiments, the controller 110 sends the entire updated portion of the map to the headset 105. In other embodiments, the controller 110 compares the updated portion of the map to a copy of the original portion of the map. Based on the comparison, the controller 110 only sends the headset 105 updated features. The VR system modifies the content displayed to the user 101 updated portion of the map received from the controller 105.

Figure 3:
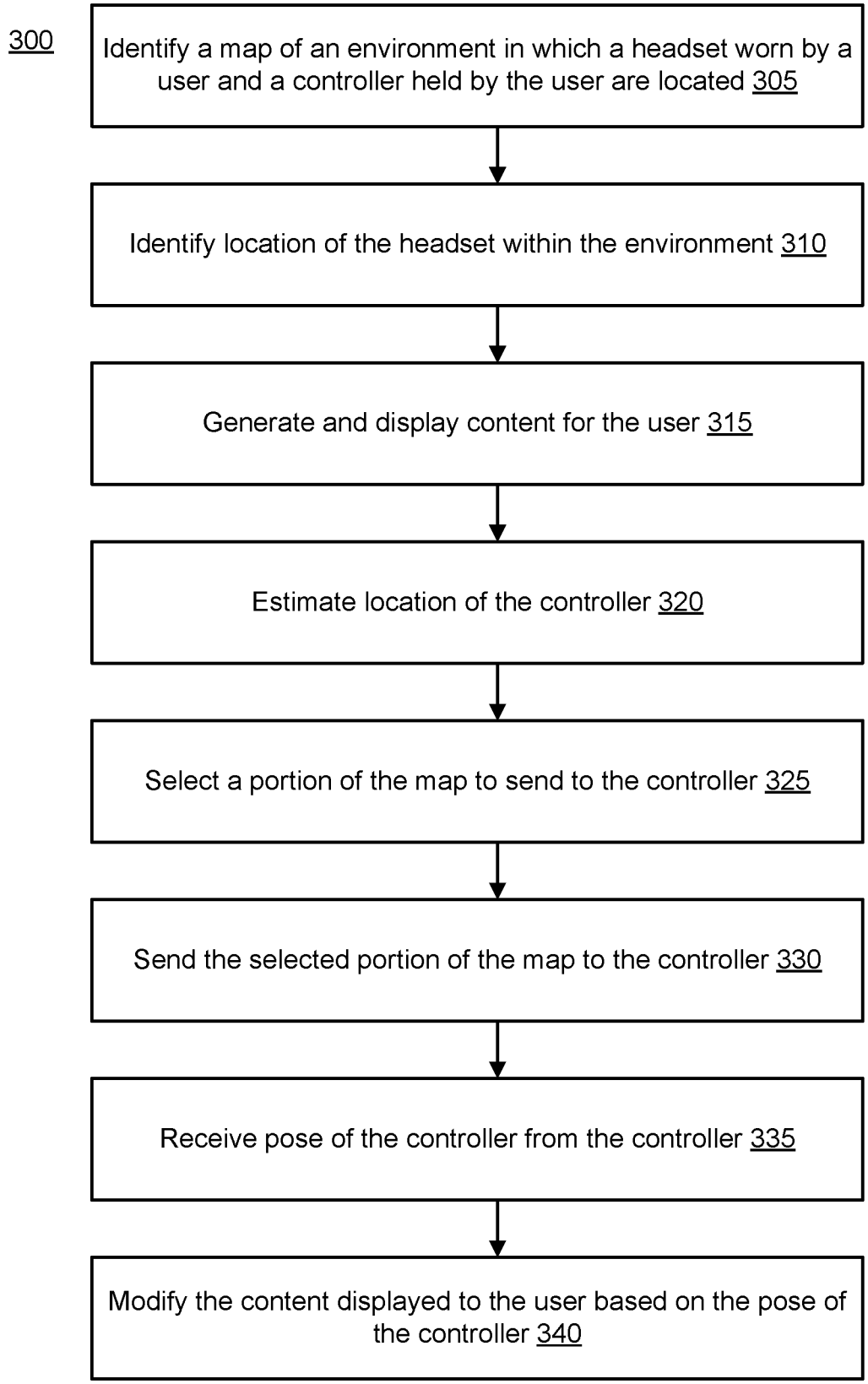
FIG. 3 shows a flowchart for determining the pose of a controller from the controller.

FIG. 3 shows a flowchart 300 for determining the pose of a controller 110 from the controller 110. The headset 105 of the virtual reality system identifies 305 a map of an environment in which a headset 105 worn by a user and a controller 110 held by the user are located. The headset 105 identifies 310 its location within the environment. Based on the location of the headset 105, the headset 105 generates and displays 315 content to the user of the headset 105. The headset 105 estimates 320 the location of the controller 110 within the environment 100. Using the estimated location of the controller 110, the headset 105 selects 325 a portion of the map to send to the controller 110. One or more rules may be used when selecting which portion of the map to send to the controller 110, as discussed in FIG. 2. The headset 105 sends 330 the selected portion of the map to the controller 110. The controller 110 uses the selected portion of the map and the components of the controller 110 to determine its pose. The controller 110 may also use information received from an external base station or external tracking system to determine its pose. Additionally, the controller 110 may resolve features within the portion of the map, identify previously unseen features, and update scaling metrics. The headset 105 receives 335 pose information of the controller 110 from the controller 110. The headset 105 may also receive an updated map from the controller 110. Based on the pose information and updated map, the headset 105 modifies 340 the content displayed to the user 101. In some embodiments, the content includes a portion of the user's body.

In an embodiment, a non-transitory computer-readable storage medium containing computer program code that, when executed by a processor, causes the processor to perform steps including identifying a map of an environment, wherein a headset worn by a user and a controller are located within the environment, and wherein the headset and the controller each contain an image sensor. The steps further include identifying a location of the headset within the environment based on an image captured by the image sensor of the headset. The steps further include generating and displaying content for the user on the headset based on the location of the headset within the environment. The steps further include determining an estimated location of the controller, selecting a portion of the map to send to the controller based on the estimated location of the controller. The steps further include sending the selected portion of the map to the controller. The steps further include receiving, from the controller, a pose of the controller, wherein the pose was determined by the controller using the image sensor of the controller and the selected portion of the map. The steps further include modifying the content displayed on the headset based on the pose received from the controller.

In some embodiments, the steps further include receiving an indication that the controller has updated the received portion of the map and updating the map of the environment. In some embodiments, the selected portion of the map includes one or more features of the map. In some embodiments, the steps further include receiving, from the controller, features of the environment, wherein the features were not in the selected portion of the map and updating the map of the environment to include the features.

In some embodiments, the steps further include tracking the user's movement through the environment using the image sensor of the headset and the image sensor of the controller, and updating the content displayed on the headset based on the user's movement through the environment. In some embodiments, the steps further include determining a position of the user by applying a computational model to a set of images from the image sensor of the headset or the image sensor of the controller, and updating the content displayed on the headset based on output of the computational model.

In an embodiment, a system includes a processor, and a non-transitory computer-readable storage medium containing instructions that, when executed by the processor, cause the processor to identify a map of an environment, wherein a headset worn by a user and a controller are located within the environment, and wherein the headset and the controller each contain an image sensor. The instructions, when executed by the processor, further cause the processor to identify a location of the headset within the environment based on an image captured by the image sensor of the headset, generate and display content for the user on the headset based on the location of the headset within the environment, determine an estimated location of the controller, select a portion of the map to send to the controller based on the estimated location of the controller, send the selected portion of the map to the controller, receive, from the controller, a pose of the controller, wherein the pose was determined by the controller using the image sensor of the controller and the selected portion of the map, and modify the content displayed on the headset based on the pose received from the controller.

In some embodiments, the non-transitory computer-readable storage medium further contains instructions that cause the processor to receive an indication that the controller has updated the received portion of the map and update the map of the environment. In some embodiments, the non-transitory computer-readable storage medium further contains instructions that cause the processor to track the user's movement through the environment using the image sensor of the headset and the image sensor of the controller, and update the content displayed on the headset based on the user's movement through the environment. In some embodiments, the updated content includes a portion of the user's body. In some embodiments, the non-transitory computer-readable storage medium further containing instructions that cause the processor to determine a position of the user by applying a computational model to a set of images from the image sensor of the headset or the image sensor of the controller and update the content displayed on the headset based on output of the computational model.

What is claimed is:

1. A method comprising:
identifying a map of an environment, wherein a headset worn by a user and a controller are located within the environment, and wherein the headset and the controller each contain an image sensor;
identifying a location of the headset within the environment based on an image captured by the image sensor of the headset;
generating and displaying content for the user on the headset based on the location of the headset within the environment;
determining an estimated location of the controller;
selecting a portion of the map to send to the controller based on the estimated location of the controller;
sending the selected portion of the map to the controller;
receiving, from the controller, a pose of the controller, wherein the pose was determined by the controller using the image sensor of the controller and the selected portion of the map; and
modifying the content displayed on the headset based on the pose received from the controller.

2. The method of claim 1, further comprising:
receiving an indication that the controller has updated the received portion of the map; and
updating the map of the environment.

3. The method of claim 1, wherein the controller determines its pose with respect to its environment using one of a gyroscope, an accelerometer, and a magnetometer.

4. The method of claim 1, wherein the map of the environment is a point cloud environment.

5. The method of claim 1, wherein the selected portion of the map includes one or more features of the map.

6. The method of claim 1, further comprising:
receiving, from the controller, features of the environment, wherein the features were not in the selected portion of the map; and
updating the map of the environment to include the features.

7. The method of claim 1, further comprising:
tracking the user's movement through the environment using the image sensor of the headset and the image sensor of the controller; and
updating the content displayed on the headset based on the user's movement through the environment.

8. The method of claim 7, wherein the updated content includes a portion of the user's body.

9. The method of claim 1, further comprising:
determining a position of the user by applying a computational model to a set of images from the image sensor of the headset or the image sensor of the controller; and
updating the content displayed on the headset based on output of the computational model.

10. A non-transitory computer-readable storage medium containing computer program code that, when executed by a processor, causes the processor to perform steps comprising:
identifying a map of an environment, wherein a headset worn by a user and a controller are located within the environment, and wherein the headset and the controller each contain an image sensor;
identifying a location of the headset within the environment based on an image captured by the image sensor of the headset;
generating and displaying content for the user on the headset based on the location of the headset within the environment;
determining an estimated location of the controller;
selecting a portion of the map to send to the controller based on the estimated location of the controller;
sending the selected portion of the map to the controller;
receiving, from the controller, a pose of the controller, wherein the pose was determined by the controller using the image sensor of the controller and the selected portion of the map; and modifying the content displayed on the headset based on the pose received from the controller.

11. The non-transitory computer-readable storage medium of claim 10, the steps further comprising:
receiving an indication that the controller has updated the received portion of the map; and
updating the map of the environment.

12. The non-transitory computer-readable storage medium of claim 10, wherein the selected portion of the map includes one or more features of the map.

13. The non-transitory computer-readable storage medium of claim 10, the steps further comprising:
receiving, from the controller, features of the environment, wherein the features were not in the selected portion of the map; and
updating the map of the environment to include the features.

14. The non-transitory computer-readable storage medium of claim 10, the steps further comprising:
tracking the user's movement through the environment using the image sensor of the headset and the image sensor of the controller; and
updating the content displayed on the headset based on the user's movement through the environment.

15. The non-transitory computer-readable storage medium of claim 10, the steps further comprising:
determining a position of the user by applying a computational model to a set of images from the image sensor of the headset or the image sensor of the controller; and
updating the content displayed on the headset based on output of the computational model.

16. A system comprising:
a processor; and
a non-transitory computer-readable storage medium containing instructions that, when executed by the processor, cause the processor to:
identify a map of an environment, wherein a headset worn by a user and a controller are located within the environment, and wherein the headset and the controller each contain an image sensor;
identify a location of the headset within the environment based on an image captured by the image sensor of the headset;
generate and display content for the user on the headset based on the location of the headset within the environment;
determine an estimated location of the controller;
select a portion of the map to send to the controller based on the estimated location of the controller;
send the selected portion of the map to the controller;
receive, from the controller, a pose of the controller, wherein the pose was determined by the controller using the image sensor of the controller and the selected portion of the map; and
modify the content displayed on the headset based on the pose received from the controller.

17. The system of claim 16, the non-transitory computer-readable storage medium further containing instructions that cause the processor to:
receive an indication that the controller has updated the received portion of the map; and
update the map of the environment.

18. The system of claim 16, the non-transitory computer-readable storage medium further containing instructions that cause the processor to:
track the user's movement through the environment using the image sensor of the headset and the image sensor of the controller; and
update the content displayed on the headset based on the user's movement through the environment.

19. The system of claim 18, wherein the updated content includes a portion of the user's body.

20. The system of claim 16, the non-transitory computer-readable storage medium further containing instructions that cause the processor to:
determine a position of the user by applying a computational model to a set of images from the image sensor of the headset or the image sensor of the controller; and
update the content displayed on the headset based on output of the computational model.

* * * * *

UNITED STATES PATENT AND TRADEMARK OFFICE
CERTIFICATE OF CORRECTION

| | | |
|---|---|---|
| PATENT NO. | : 10,838,515 B1 | Page 1 of 1 |
| APPLICATION NO. | : 16/367032 | |
| DATED | : November 17, 2020 | |
| INVENTOR(S) | : Eldad Yitzhak et al. | |

It is certified that error appears in the above-identified patent and that said Letters Patent is hereby corrected as shown below:

On the Title Page

Column 2, Item (57), Line 6, delete "Based headset's location, the VR system generates" and insert -- Based on the headset's location, the VR system generates --.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*